(12) United States Patent
Chang et al.

(10) Patent No.: US 9,842,283 B2
(45) Date of Patent: Dec. 12, 2017

(54) TARGET OBJECT DETECTION SYSTEM AND A METHOD FOR TARGET OBJECT DETECTION

(71) Applicant: AUTOMOTIVE RESEARCH & TESTING CENTER, Lugong, Changhua County (TW)

(72) Inventors: Kuo-Ching Chang, Lugong (TW); Chuan-Ren Li, Lugong (TW); Han-Wen Huang, Lugong (TW)

(73) Assignee: AUTOMOTIVE RESEARCH & TESTING CENTER, Lugong, Changhua County (TW)

( * ) Notice: Subject to any disclaimer, the term of this patent is extended or adjusted under 35 U.S.C. 154(b) by 89 days.

(21) Appl. No.: 15/142,391

(22) Filed: Apr. 29, 2016

(65) Prior Publication Data

US 2017/0316284 A1 Nov. 2, 2017

(51) Int. Cl.
*G06K 9/00* (2006.01)
*G06K 9/62* (2006.01)

(52) U.S. Cl.
CPC ....... *G06K 9/6269* (2013.01); *G06K 9/00805* (2013.01); *G06K 9/6256* (2013.01); *G06K 9/6262* (2013.01)

(58) Field of Classification Search
CPC ...... G06F 3/011; G06F 3/0304; G06F 3/0346; A63F 13/213; A63F 13/24; A63F 13/426; A63F 13/428; A63F 13/655; A63F 13/00; G06T 7/73; G06K 9/00221; G06K 9/00335; G06K 9/00369; G08C 17/00; G08C 17/02; H04N 5/2226
See application file for complete search history.

(56) References Cited

U.S. PATENT DOCUMENTS 8,165,407 B1 4/2012 Khosla et al.

FOREIGN PATENT DOCUMENTS

CN 103593672 A 2/2014

*Primary Examiner* — Duy M Dang
(74) *Attorney, Agent, or Firm* — Ladas & Parry LLP

(57) ABSTRACT

A target object detection system includes a detection unit and a machine learning unit. The detection unit obtains an image and outputs a notification signal upon determining that a portion of the image resembles a target object by performing a classification operation. The machine learning unit performs a training operation using the image to obtain new weak classifier parameters for update in the detection unit when a determination made using weak classifier parameters used in the classification operation of the detection unit differs from one made using strong classifier parameters.

18 Claims, 6 Drawing Sheets

US 9,842,283 B2

TARGET OBJECT DETECTION SYSTEM AND A METHOD FOR TARGET OBJECT DETECTION

FIELD

The disclosure relates to a detection system and a detection method, more particularly to a target object detection system capable of adaptive learning and a method for detecting a target object and capable of adaptive learning.

BACKGROUND

Recent Advanced Driver Assistance Systems (ADAS) have vastly adopted artificial intelligence to reduce the rate of traffic accident, with many companies in the industry focusing their research and development on technologies, such as a lane line detection system, a parking assist system, a collision avoidance system and so forth.

Image recognition is one of the most important techniques in the aforementioned systems. The image recognition technique mostly focuses on training parameters of a classifier by virtue of an algorithm associated with machine learning for classification so as to recognize objects in an image. However, due to the restricted performance of an embedded system provided on a vehicle, performance of a classifier of the embedded system is limited. Therefore, how to effectively reduce the false positive rate in a diversified road environment while taking into consideration the restricted performance of a vehicle embedded system is a key point in current research and development projects.

SUMMARY

Therefore, an object of the disclosure is to provide a target object detection system, and a method of target object detection.

According to a first aspect of the disclosure, a target object detection system includes a detection unit and a machine learning unit.

The detection unit is configured to obtain an image, to perform an operation associated with classification using weak classifier parameters so as to determine whether a portion of the image resembles a target object, and to output the image. The detection unit is further configured to output a notification signal when it is determined that the portion of the image resembles the target object. The machine learning unit is communicably coupled to the detection unit for receiving the image, and is configured to perform operations associated with classification using the weak classifier parameters and strong classifier parameters, respectively, so as to make respective two determinations as to whether the portion of the image resembles the target object. When results of the respective two determinations are different, the machine learning unit is further configured to perform a training operation using the image so as to obtain new weak classifier parameters which is used to update the weak classifier parameters of the detection unit and of the machine learning unit.

According to a second aspect of the disclosure, a method for target object detection is to be implemented by a target object detection system that includes a detection unit and a machine learning unit. The method includes the following steps of:

after obtaining an image, by the detection unit, performing an operation associated with classification using weak classifier parameters so as to determine whether a portion of the image resembles a target object;

when it is determined that the portion of the image resembles the target object, outputting, by the detection unit, a notification signal;

outputting, by the detection unit, the image to the machine learning unit;

after receiving the image, performing, by the machine learning unit, operations associated with classification using the weak classifier parameters and strong classifier parameters, respectively, so as to make respective two determinations as to whether the portion of the image resembles the target object; and when results of the respective two determinations are different, performing, by the machine learning unit, a training operation using the image so as to obtain new weak classifier parameters which is used to update the weak classifier parameters of the detection unit and of the machine learning unit.

An effect of the disclosure resides in that, by virtue of the detection unit, real-time operations may be performed on the image, and by virtue of the machine learning unit, the image is used for subsequent training operation for adaptive learning. Since auxiliary determination made through labor or tag classification are not required in an embodiment of this disclosure, a large number of learning samples may be collected rapidly for improving performance of the target object detection system, thereby enhancing driving safety.

BRIEF DESCRIPTION OF THE DRAWINGS

Other features and advantages of the disclosure will become apparent in the following detailed description of embodiment(s) with reference to the accompanying drawings, of which.

DETAILED DESCRIPTION

Figure 1:
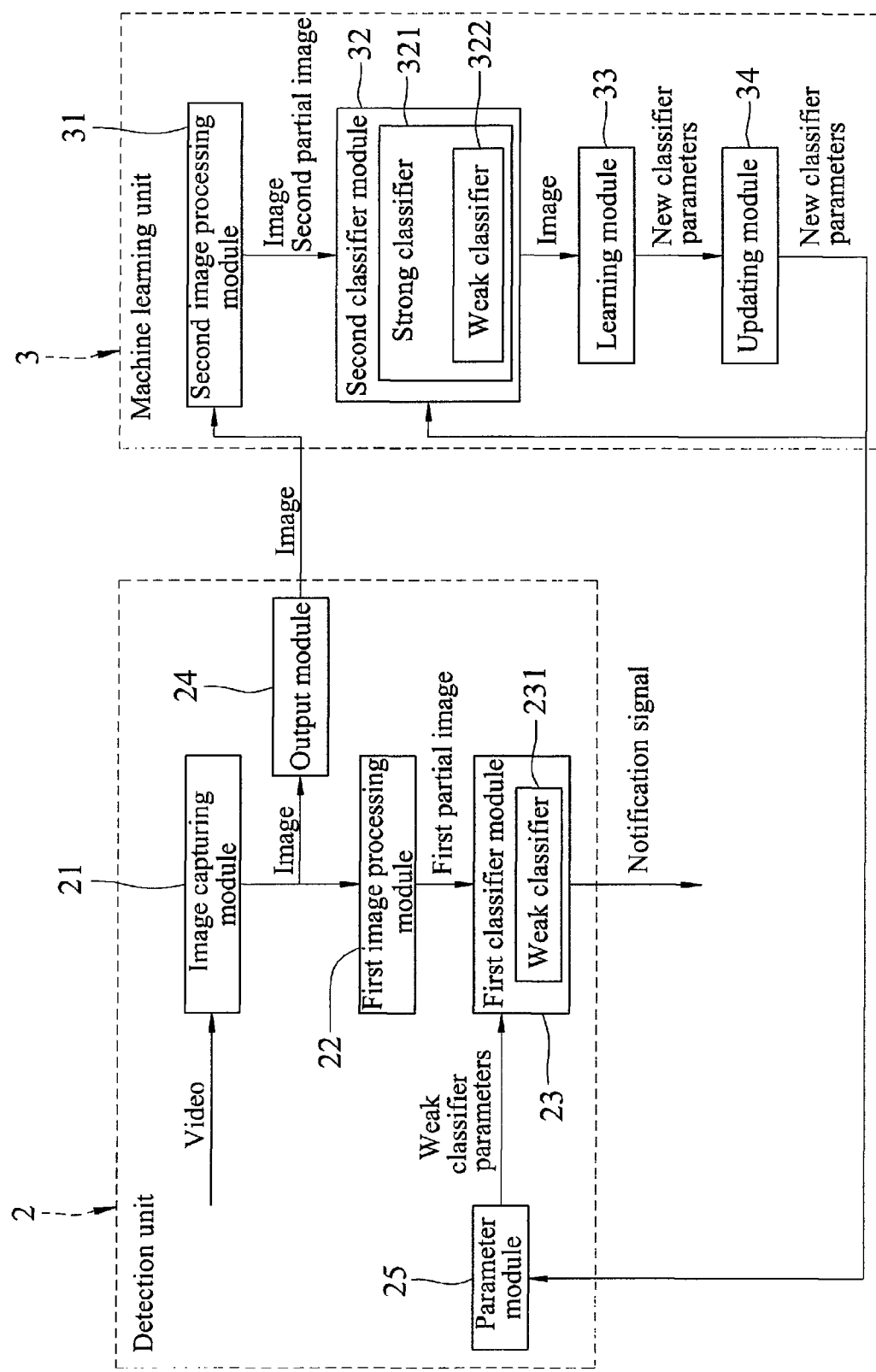
FIG. 1 is a block diagram illustrating a first embodiment of a target object detection system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
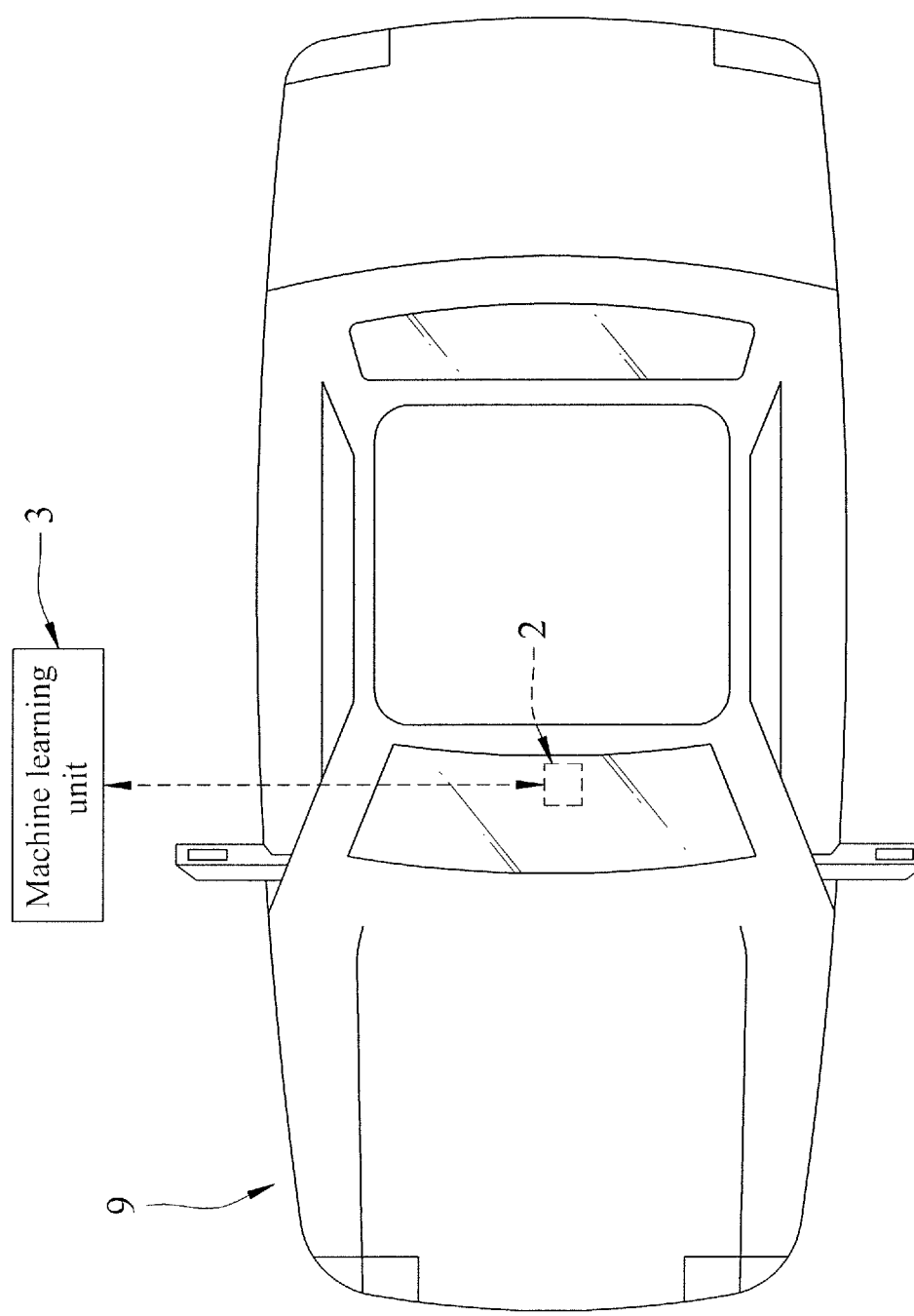
FIG. 2 is a schematic diagram illustrating an embodiment that a detection unit is disposed on a vehicle while a machine learning unit is communicably coupled to the detection unit.

Referring to FIG. 1 and FIG. 2, a first embodiment of a target object detection system according to the disclosure includes a detection unit 2 and a machine learning unit 3.

The detection unit 2 is adapted to be disposed on a vehicle 9 (see FIG. 2), is configured to obtain an image, to perform an operation associated with classification using weak classifier parameters so as to determine whether a portion of the image resembles a target object, and to output the image. The detection unit 2 is further configured to output a notification signal when it is determined that the portion of the image resembles the target object, and to update the weak classifier parameters in response to receipt of new weak classifier parameters. The detection unit 2 is further configured to receive a video, and to extract the image from the video.

In this embodiment, the video thus received is exemplified as a video stream generated by a car driving recorder (not shown) which records images of surroundings of the vehicle 9, and the video is provided to the detection unit 2 for determination as to whether there are any obstacles nearby. The aforementioned target object is any obstacle predefined in the target object detection system (e.g., pedestrians, other vehicles, etc.). The detection unit 2 may be further utilized for other vehicle image processing, and is not limited to the disclosure herein.

The detection unit 2 includes an image capturing module 21, a first image processing module 22, a first classifier module 23, an output module 24 and a parameter module 25.

The image capturing module 21 is configured to capture the image from the video thus received, i.e., the video stream generated by the car driving recorder.

The first image processing module 22 is connected electrically to the image capturing module 21 for receiving the image, and is configured to extract a first partial image from the image to serve as the portion of the image subject to the determination by the detection unit 2.

The first classifier module 23 is connected electrically to the first image processing unit 22 for receiving the first partial image, and is configured to perform the operation associated with classification using the weak classifier parameters so as to determine whether the first partial image resembles the target object. The first partial image which is extracted from the image captured by the image capturing module 21 corresponds to the image to be outputted by the detection unit 2. When it is determined that the first partial image resembles the target object, it means that the first classifier module 23 determines there to be an obstacle nearby the vehicle 9, and the first classifier module 23 is further configured to output the notification signal for notifying a driver of the vehicle 9 of the obstacle.

The output module 24 is connected electrically to the image capturing module 21 for receiving the image, and is configured to output the image to the machine learning unit 3.

The parameter module 25 is connected electrically to the first classifier module 23, and is configured to store the weak classifier parameters which is available for usage by the first classifier module 23 to perform the operation associated with classification.

The machine learning unit 3 is communicably coupled to the detection unit 2 for receiving the image therefrom. The machine learning unit 3 is configured to perform operations associated with classification using the weak classifier parameters and strong classifier parameters, respectively, so as to make respective two determinations as to whether the portion of the image resembles the target object. When results of the respective two determinations are different, the machine learning unit 3 is further configured to perform a training operation using the image so as to obtain new weak classifier parameters which is used to update the weak classifier parameters of the machine learning unit 3, and to update the weak classifier parameters stored in the parameter module 25 of the detection unit 2.

In this embodiment, the machine learning unit 3 may be disposed in the vehicle 9, or may be disposed in a remote server (not shown). The machine learning unit 3 is wirelessly (may be wiredly in some cases) connected to the detection unit 2 for allowing the output module 24 to output the image thereto and allowing the parameter module 25 to receive the new weak classifier parameters therefrom.

The machine learning unit 3 includes a second image processing module 31, a second classifier module 32, a training module 33 and an updating module 34.

The second image processing module 31 is configured to receive the image from the output module 24 of the detection unit 2, and to extract from the image a second partial image which includes content identical to that of the first partial image and which serves as the portion of the image subject to the two determinations by the machine learning unit 3.

The second classifier module 32 is connected electrically to the second image processing unit 31 for receiving the second partial image and the image, and is configured to perform the operations associated with classification using the weak classifier parameters and the strong classifier parameters, respectively, so as to make the respective two determinations as to whether the second partial image resembles the target object. Since the second classifier module 32 and the first classifier module 23 use the identical weak classifier parameters for performing the operation associated with classification, the result of the determination made using the weak classifier parameters by the second classifier module 32 should be equivalent to that of the determination made by the first classifier module 23. In addition, since a total number of the strong classifier parameters is greater than a total number of the weak classifier parameters, the result of the determination made using the strong classifier parameters has higher accuracy. In this way, the result of the determination made using the strong classifier parameters is regarded as a correct result. When results of the respective two determinations made using the weak classifier parameters and the strong classifier parameters, respectively, are different, it means that the result of the determination made using the weak classifier parameters is erroneous, and the image which corresponds to the erroneous result is outputted by the second classifier module 32.

The training module 33 is connected electrically to the second classifier module 32 for receiving the image therefrom, and is configured to use the image as a training sample for training parameters of the second classifier module 32 so as to obtain the new weak classifier parameters.

The updating module 34 is connected electrically to the training module 33 for receiving the new weak classifier parameters, and is configured to update the weak classifier parameters of the second classifier module 32 using the new weak classifier parameters and to transmit the new weak classifier parameters to the parameters module 25 of the detection unit 2 for update of the weak classifier parameters used by the first classifier module 23. In this embodiment, the image that corresponds to the erroneous result is gathered and is used for training the parameters of the second classifier module 32 so as to obtain the new weak classifier parameters that is subsequently used to update the weak classifier parameters.

In one embodiment, the updating module 34 is further configured to calculate a trust score for the new weak classifier parameters using a predetermined set of image samples, so as to determine whether or not the new weak classifier parameters are indeed superior to the weak classifier parameters in detecting obstacles predefined in the target object detection system (e.g., pedestrians, other vehicles, etc.). It is when the trust score thus calculated is greater than a trust score of the weak classifier parameters that the updating module 34 updates the weak classifier parameters of the second classifier module 32 using the new weak classifier parameters and transmits the new weak classifier parameters to the parameter module 25 of the detection unit 2 for update of the weak classifier parameters of the first classifier module 23.

Figure 3:
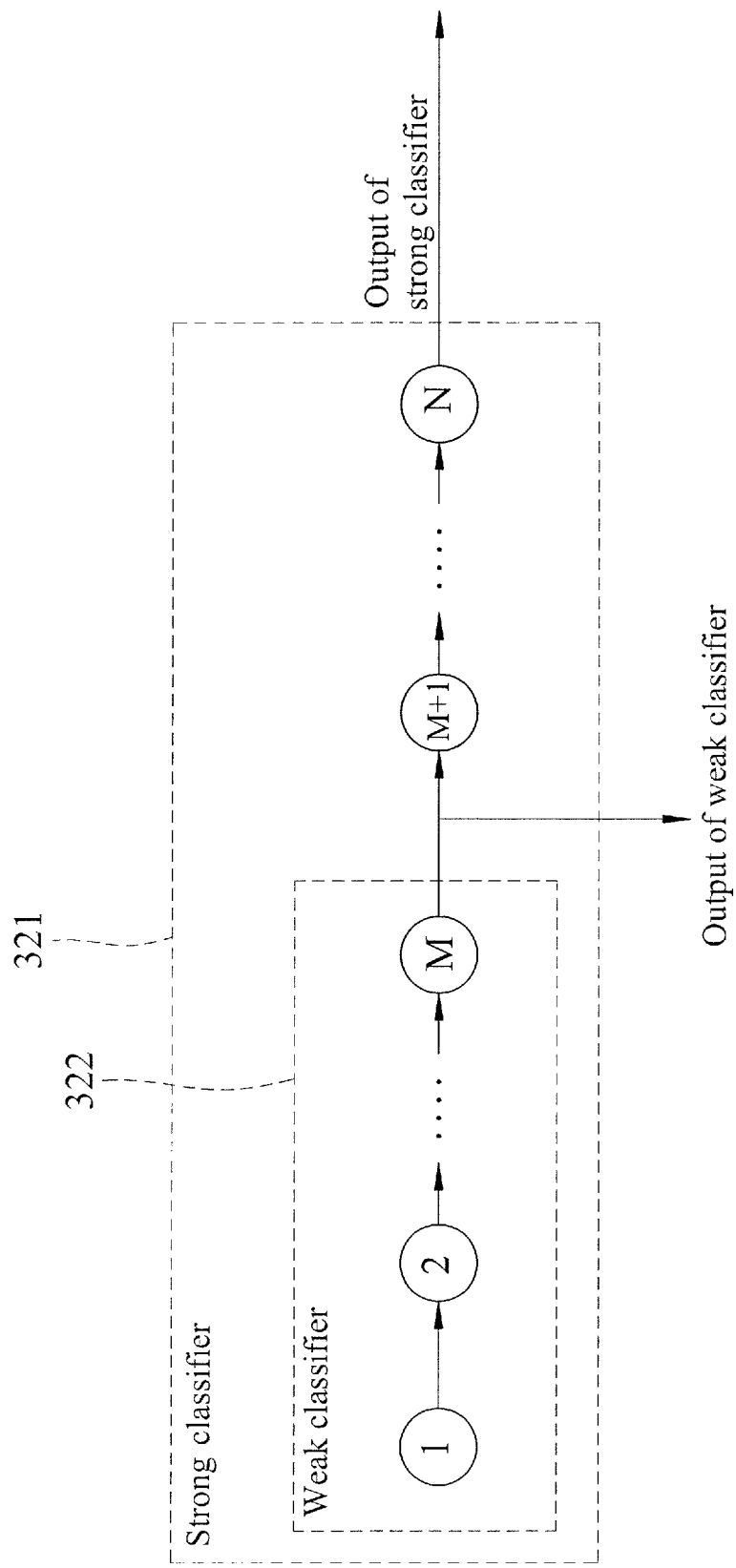
FIG. 3 is a schematic diagram illustrating an embodiment of a strong classifier where earlier M stages thereof form a weak classifier.

It should be noted that, in one embodiment, the first classifier module 23 includes a weak classifier 231, and the weak classifier 231 is utilized in combination with the weak classifier parameters for performing the operation associated with classification. On the other hand, the second classifier module 32 includes a strong classifier 321 as shown in FIG. 3. The strong classifier 321 is utilized in combination with the strong classifier parameters for performing the operation associated with classification. The first M stages of the strong classifier 321 form a weak classifier 322, and the weak classifier 322 is utilized in combination with the weak classifier parameters for performing the operation associated with classification. In this way, the second classifier module 32 is able to output the results of the respective two determinations.

Based on the aforementioned explanations, the disclosure has the following advantages.

First, by providing the detection unit 2, real-time computing is performed on each image extracted from the video stream outputted by the car driving recorder, and a notification signal is outputted for notifying the driver when it is determined that the portion of the image resembles the target object (i.e., that an obstacle exists). By continuously updating the weak classifier parameters, the accuracy of classification made by the first classifier module 23 may be further improved so that a false positive rate may be decreased.

Moreover, by providing the machine learning unit 3 which is communicably coupled to the detection unit 2, and by means of the second classifier module 32 that performs operations associated with classification using the weak classifier parameters and the strong classifier parameters, respectively, to obtain the results of the respective two determinations, it is achievable to ascertain whether the result of the determination made by the first classifier module 23 is erroneous. When it is ascertained that the result of the determination is erroneous, the image is outputted to the learning module 33 to enable the learning module 33 to train the parameters of the second classifier module 32 to obtain the new weak classifier parameters, and the updating module 34 updates the weak classifier parameters using the new weak classifier parameters. In this way, the image which results in the erroneous result of judgment by the first classifier module 23 may be automatically determined, and this image is used for self-training so that the false positive rate may be reduced in the future. Since the aforementioned procedures are automatically performed by the target object detection system, auxiliary determination made through labor or tag classification may be omitted, so that massive training samples are collected rapidly for training the weak classifier parameters. In this way, performance of the detection unit 2 may be promoted rapidly and the false positive rate may be reduced so as to better ensure driving safety.

Referring once again to FIG. 2, by providing the detection unit 2 in a vehicle embedded system (not shown) of the vehicle 9, and by providing the machine learning unit 3 in a server that is wirelessly connected to the detection unit 2, the machine learning unit 3 is not required to be limited by performance of the embedded vehicle system, and the second classifier module 32 which has superior computing power may be provided in the machine learning unit 3. Therefore, faster real-time operation associated with classification may be performed using the strong classifier parameters to ascertain whether the result of the determination made by the first classifier module 23 is erroneous, so that the weak classifier parameters may be further improved in the subsequent learning and updating procedures. However, in other embodiments, the machine learning unit 3 may be disposed in the vehicle embedded system of the vehicle 9 along with the detection unit 2.

Second, by virtue of the updating module 34 only updating the weak classifier parameters using the new weak classifier parameters when the latter has a higher trust score, better performance of the first classifier module 23 and the second classifier module 32 may be ensured after each update. When the image which results in a false positive is not suitable for training the parameters of the second classifier module 32, the new weak classifier parameters may not be used for updating parameters of the first classifier module 23 and the second classifier module 32, so as to prevent inferior detecting capability.

Figure 4:
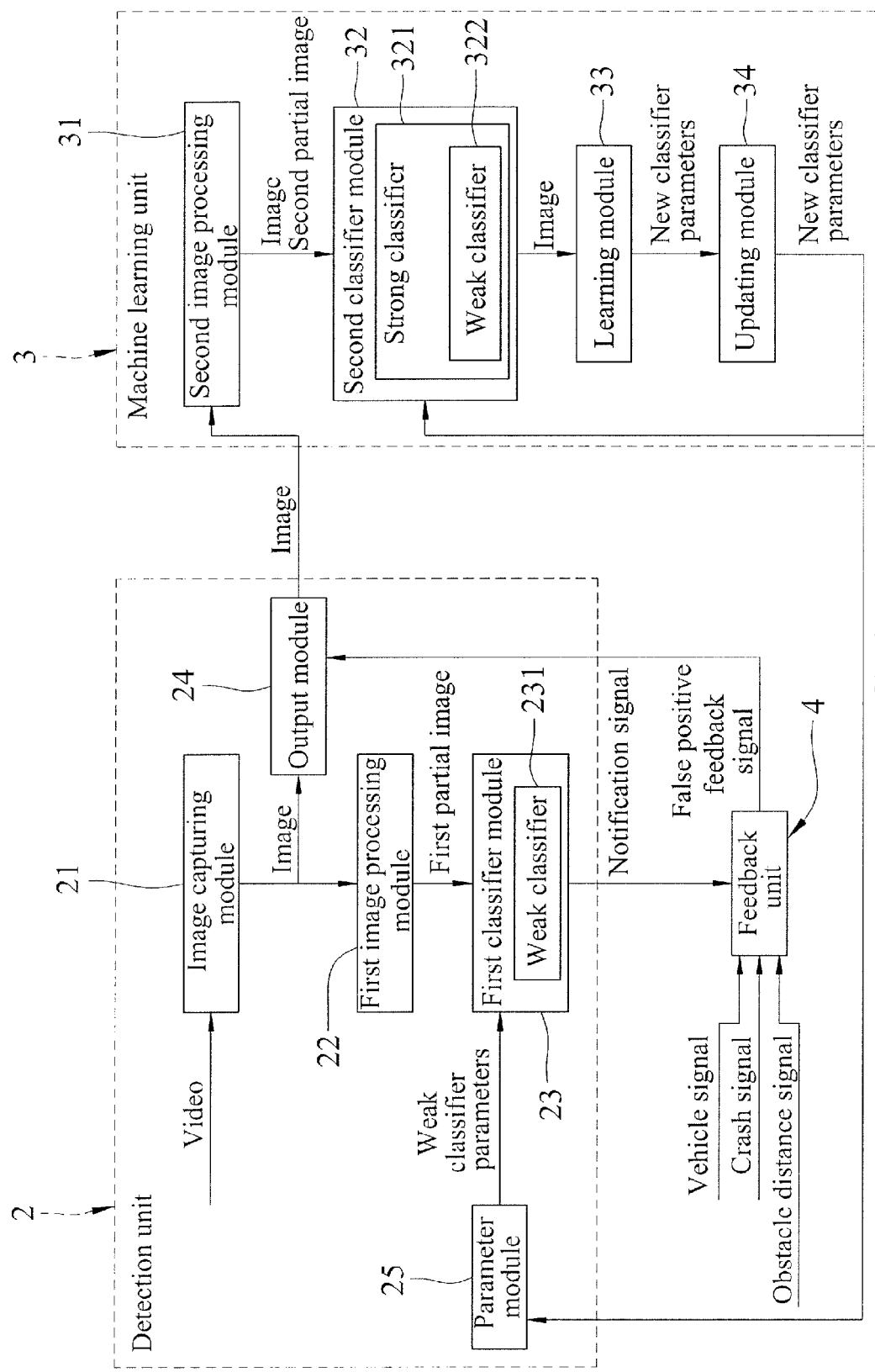
FIG. 4 is a block diagram illustrating a second embodiment of the target object detection system according to the disclosure.
Figure 5:
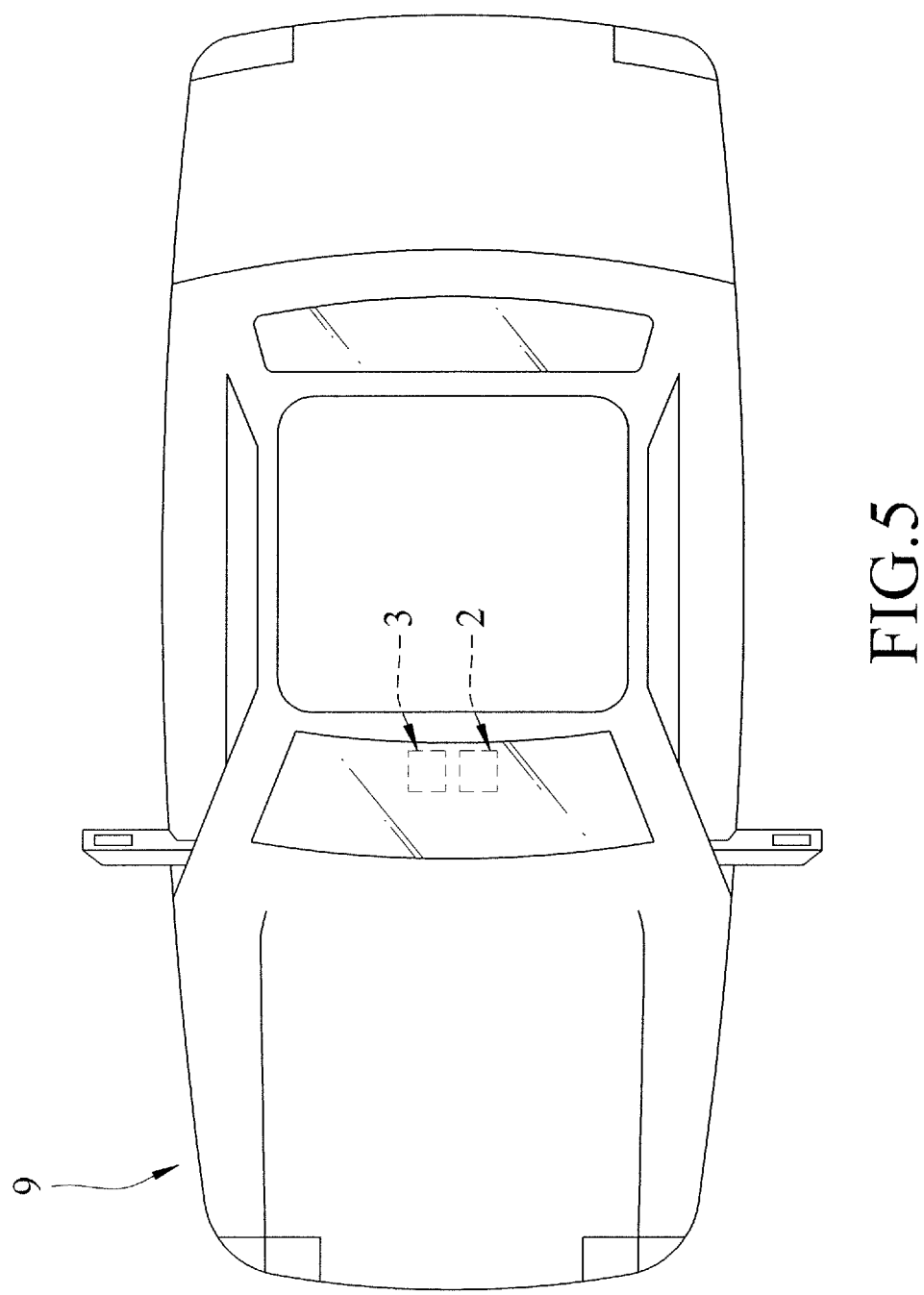
FIG. 5 is a schematic diagram illustrating an embodiment that the detection unit and the machine learning unit are both disposed on the vehicle.

Referring to FIG. 4 and FIG. 5, a second embodiment of the target object detection system according to the disclosure is illustrated. The second embodiment of the target object detection system is similar to the first embodiment, and has the following differences compared with the first embodiment.

The first classifier module 23 of the detection unit 2 further includes a distance calculating module 232. The distance calculating module 232 is configured to, when the weak classifier 231 determines that there is an obstacle nearby the vehicle 9, obtain the first partial image, calculate a distance of the vehicle 9 from the obstacle based on a size of the obstacle contained in the first partial image, and output an obstacle distance signal which indicates the distance of the vehicle 9 from the obstacle.

The second embodiment of the target object detection system further includes a feedback unit 4 which is connected electrically to the detection unit 2 for receiving the notification signal, and which is configured to further receive a vehicle signal that is associated with operation of the vehicle 9 provided with the detection unit 2, a crash signal that is generated by a crash sensor of the vehicle 9, and the obstacle distance signal. The feedback unit 4 is further configured to output a false positive feedback signal to the output module 24 based on one or more of the vehicle signal, the crash signal, the obstacle distance signal and the notification signal. The output module 24 in response to receipt of the false positive feedback signal outputs the image to the second image processing module 31 of the machine learning unit 3.

In this embodiment, the vehicle signal indicates vehicle speed of the vehicle 9 and a travel distance of a brake pedal of the vehicle 9. However, the vehicle signal may indicate one of the vehicle speed and the travel distance of the brake pedal, and is not limited to the disclosure herein.

The feedback unit 4 is configured to output the false positive feedback signal in at least one of the following scenarios.

The first scenarios is where the feedback unit 4 is in receipt of the notification signal, and a rate of change of decrease of the vehicle speed is not greater than a preset deceleration threshold value, or alternatively, the feedback unit 4 is in receipt of the notification signal, and the travel distance of the brake pedal is not greater than a preset brake stroke threshold value.

This scenario means that the first classifier module 23 determines that there exists an obstacle (i.e., the first partial image resembles the target object) but the vehicle 9 is not decelerating rapidly or the driver is not pressing the brake pedal hard. Therefore, under this scenario, the feedback unit 4 determines that a judgment made by the first classifier module 23 is erroneous.

The second scenarios is where the feedback unit 4 in not in receipt of the notification signal, and the rate of change of decrease of the vehicle speed is greater than the preset deceleration threshold value, or alternatively, the feedback unit 4 is not in receipt of the notification signal, and the travel distance of the brake pedal is greater than the preset brake stroke threshold value.

This scenario means that the first classifier module 23 determines that no obstacle exists (i.e., the first partial image does not resemble the target object) but the vehicle 9 decelerates rapidly or the driver presses the brake pedal hard. Therefore, under this scenario, the feedback unit 4 determines that a judgment made by the first classifier module 23 is erroneous.

A third scenario is where the feedback unit 4 is not in receipt of the notification signal but is in receipt of the crash signal.

This scenario means that the first classifier module 23 does not output the notification signal or output of the notification signal by the first classifier module 23 is too late, so the driver does not have enough response time.

A fourth scenario is where the distance of the vehicle 9 from the obstacle is smaller than a calculated braking distance.

For example, the feedback unit 4, based on the distance of the vehicle 9 from the obstacle as calculated by the distance calculating module 232, determines that there exists an obstacle less than a safety braking distance away from (i.e., the calculated braking distance) the vehicle 9, but the vehicle 9 is still approaching the obstacle; in this situation, the feedback unit 4 determines that a judgment made by the first classifier module 23 is erroneous.

The calculated braking distance is obtained according to the following equations.

$$v^2 = v_o^2 + 2as \qquad \text{Equation 1}$$

$$S = v_o * t \qquad \text{Equation 2}$$

$$S' = s + S \qquad \text{Equation 3}$$

where S' is the calculated braking distance, v is a preset end velocity and is set to be zero, $v_0$ is an initial velocity and is equal to the vehicle speed, a is an acceleration and is obtained based on predetermined braking force of 0.4 g, s is a theoretical braking distance obtained based on the Equation 1, S is a displacement of the vehicle 9 within a response time, and t is the response time of the driver and is substantially equal to 0.8 seconds.

In this way, the second embodiment of the target object detection system is able to achieve similar effects as the first embodiment, and further includes the following advantage.

By providing the notification signal, the vehicle signal, the obstacle distance signal and the crash signal to the feedback unit 4, the feedback unit 4 is able to determine whether the first classifier module 23 has made a false positive. In addition, with the output module 24 being configured to output the image to the machine learning unit 3 only when receiving the false positive feedback signal, the image outputted by the output module 24 is an effective learning sample corresponding to a false positive made by the first classifier module 23. In this way, data throughput of the second classifier module 32 may be significantly reduced. That is, the requirement for operational performance of the second classifier module 32 may be lowered, and complexity in designing the second classifier module 32 may be reduced. As a result, an architecture having ordinary calculating capability can be used for realizing the second classifier module 32. In an embodiment where the machine learning unit 3 is directly incorporated in the vehicle embedded system of the vehicle 9 along with the detection unit 2, not only is the design cost saved but provision of an independent machine learning unit 3 on the vehicle 9 may also be rendered unnecessary. Moreover, compared with having the machine learning unit 3 in a remote server, directly providing the machine learning unit 3 in the vehicle embedded system of the vehicle 9 along with the detection unit 2 allows timely update of the parameters of the first classifier module 23 without the requirement of connection to a remote server.

It should be noted that the detection unit 2, the machine learning unit 3 and the feedback unit 4 of the target object detection system may be realized in a manner of hardware schemes (such as a processor, an IC chip, etc.) or in a manner of software schemes (such as codes including instructions to be executed by a processor).

Figure 6:
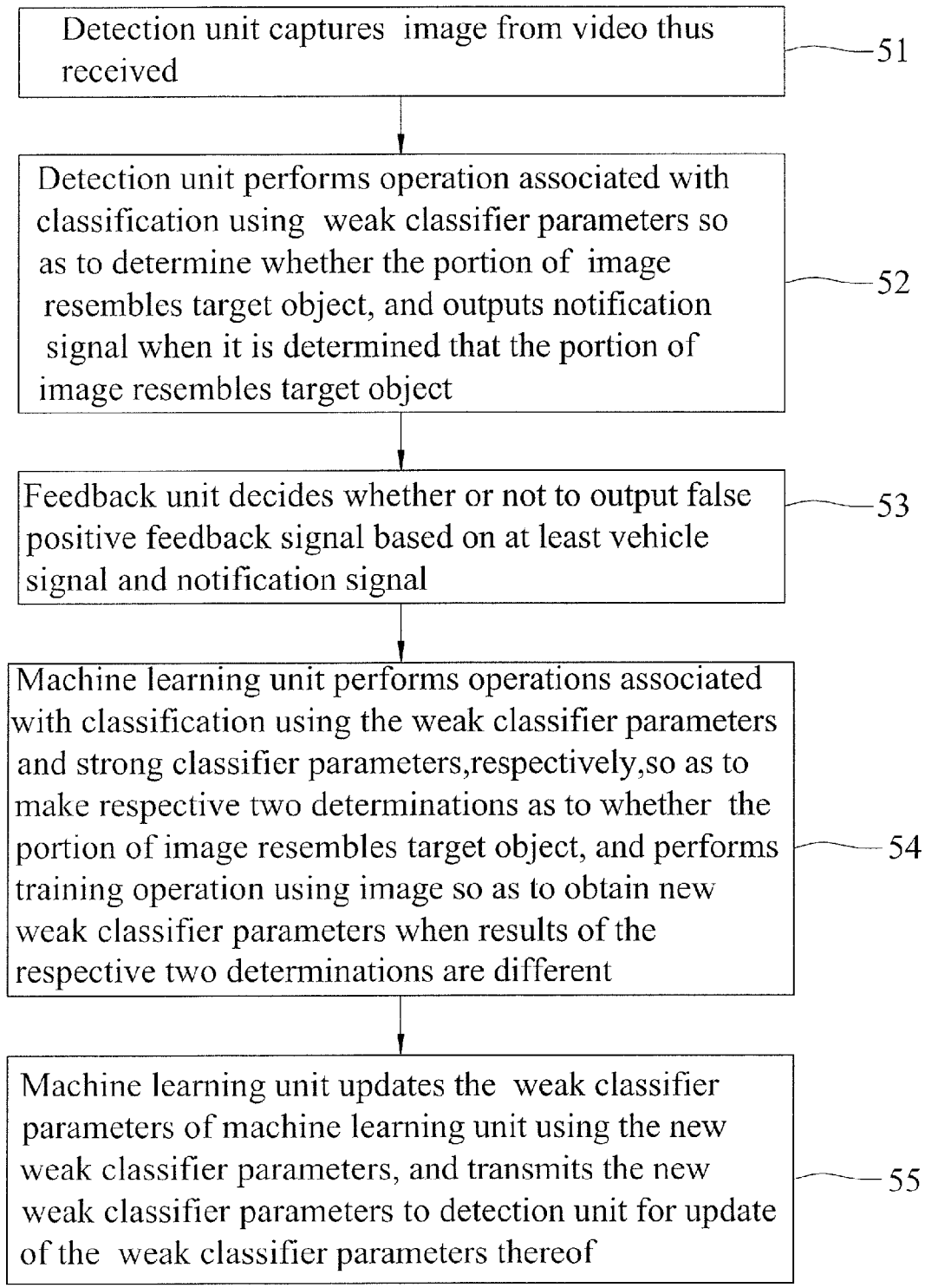
FIG. 6 is a flow chart illustrating an embodiment of a method for target object detection according to the disclosure.

Referring to FIG. 4 and FIG. 6, an embodiment of a method of target object detection according to the disclosure is to be implemented by the target object detection system and includes the following steps.

In step 51, after receiving a video, the detection unit 2 captures an image from the video thus received.

In this step, the detection unit 2 further extracts a first partial image from the image to serve as a portion of the image, and outputs the image to the machine learning unit 3 in response to receipt of a false positive feedback signal.

In step 52, the detection unit 2 performs an operation associated with classification using weak classifier parameters so as to determine whether the portion of the image resembles the target object. When it is determined that the portion of the image resembles the target object, the detection unit 2 outputs the notification signal.

In this step, the detection unit 2 performs the operation associated with classification using the weak classifier parameters so as to determine whether the first partial image resembles the target object, and outputs the notification signal indicating the presence of an obstacle (where the portion of the image is determined to be the obstacle) when it is determined that the first partial image resembles the target object.

In step 53, the feedback unit 4 receives at least a vehicle signal that is associated with operation of a vehicle 9 (see FIG. 5) provided with the detection unit 2, and decides whether or not to output the false positive feedback signal to the detection unit 2 based on at least the vehicle signal. The vehicle signal indicates at least one of vehicle speed of the vehicle 9, or a travel distance of a brake pedal of the vehicle 9.

In this step, the feedback unit 4 further receives a crash signal which is generated by a crash sensor of the vehicle 9, and an obstacle distance signal which indicates a distance of the vehicle 9 from the obstacle. The feedback unit 4 outputs the false positive feedback signal in at least one of the following scenarios.

In a first scenario, the feedback unit 4 is in receipt of the notification signal, and a rate of change of decrease of the vehicle speed is not greater than a preset deceleration threshold value; or alternatively, the feedback unit 4 is in receipt of the notification signal, and the travel distance of the brake pedal is not greater than a preset brake stroke threshold value.

In a second scenario, the feedback unit 4 is not in receipt of the notification signal, and the rate of change of decrease of the vehicle speed is greater than the preset deceleration threshold value, or alternatively, the feedback unit 4 is not in receipt of the notification signal, and the travel distance of the brake pedal is greater than the preset brake stroke threshold value.

In a third scenario, the feedback unit 4 is not in receipt of the notification signal but is in receipt of the crash signal.

In a fourth scenario, the distance of the vehicle 9 from the obstacle is smaller than a calculated braking distance. The calculated braking distance is obtained based on the vehicle speed.

After receiving the false positive feedback signal outputted by the feedback unit 4, the flow proceeds to step 54.

In step 54, the machine learning unit 3 performs operations associated with classification using the weak classifier parameters and strong classifier parameters, respectively, so as to make respective two determinations as to whether the portion of the image resembles the target object. When results of the respective two determinations are different, the machine learning unit 3 performs a training operation using the image so as to obtain new weak classifier parameters which is used to update the weak classifier parameters of the detection unit 2 and of the machine learning unit 3.

In this step, the machine learning unit 3 extracts from the image a second partial image which includes content identical to that of the first partial image and which serves as the portion of the image, and performs the operations associated with classification using the weak classifier parameters and the strong classifier parameters, respectively, so as to make respective two determinations as to whether the second partial image resembles the target object. When the results of the respective two determinations are different, using the image as a training sample for training parameters of the machine learning unit 3 so as to obtain the new weak classifier parameters.

In this step, the machine learning unit 3 calculates a trust score for the new weak classifier parameters. When the trust score thus calculated is greater than a trust score of the weak classifier parameters, the flow proceeds to step 55.

In step 55, the machine learning unit 3 updates the weak classifier parameters of the machine learning unit 3 using the new weak classifier parameters, and transmits the new weak classifier parameters to the detection unit 2 for update of the weak classifier parameters of the detection unit 2.

In this way, the method for target object detection is capable of adaptive learning and may achieve similar effects as the embodiments of the target object detection system.

To sum up, by providing the detection unit 2 and the machine learning unit 3, real-time operations may be performed on the image extracted from a video stream, and the image which corresponds to a false positive may be automatically discovered for subsequent training operation. Consequently, performance of the target object detection system may be promoted rapidly, and the false positive rate may be reduced so as to improve driving assistance, and in turn enhance driving safety.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A target object detection system comprising:
    a detection unit which is configured to obtain an image, to perform an operation associated with classification using weak classifier parameters so as to determine whether a portion of the image resembles a target object, and to output the image, said detection unit being further configured to output a notification signal when it is determined that the portion of the image resembles the target object; and
    a machine learning unit which is communicably coupled to said detection unit for receiving the image, and which is configured to perform operations associated with classification using the weak classifier parameters and strong classifier parameters, respectively, so as to make respective two determinations as to whether the portion of the image resembles the target object;
    wherein said machine learning unit is further configured to, when results of the respective two determinations are different, perform a training operation using the image so as to obtain new weak classifier parameters which is used to update the weak classifier parameters of said detection unit and of said machine learning unit.

2. The target object detection system of claim 1, wherein said detection unit is further configured to receive a video, and includes:
    an image capturing module which is configured to capture the image from the video thus received;
    a first image processing module which is connected electrically to said image capturing module for receiving the image and which is configured to extract a first partial image from the image to serve as the portion of the image used in the determination made by said detection unit;
    a first classifier module which is connected electrically to said first image processing unit for receiving the first partial image and which is configured to perform the operation associated with classification using the weak classifier parameters so as to determine whether the first partial image resembles the target object, said first classifier module being further configured to output the notification signal when it is determined that the first partial image resembles the target object; and
    an output module which is connected electrically to said image capturing module for receiving the image and which is configured to output the image to said machine learning unit.

3. The target object detection system of claim 2, wherein said machine learning unit includes:
- a second image processing module which is configured to receive the image from said output module of said detection unit, and to extract from the image a second partial image which includes content identical to that of the first partial image and which serves as the portion of the image used in the two determinations made by said machine learning unit;
- a second classifier module which is connected electrically to said second image processing unit for receiving the second partial image and the image, and which is configured to perform the operations associated with classification using the weak classifier parameters and the strong classifier parameters, respectively, so as to make the respective two determinations as to whether the second partial image resembles the target object, said second classifier module being configured to output the image when results of the respective two determinations are different;
- a training module which is connected electrically to said second classifier module for receiving the image, and which is configured to use the image as a training sample for training parameters of said second classifier module so as to obtain the new weak classifier parameters; and
- an updating module which is connected electrically to said training module for receiving the new weak classifier parameters, and which is configured to update the weak classifier parameters of said second classifier module using the new weak classifier parameters and to transmit the new weak classifier parameters to said detection unit for update of the weak classifier parameters of said first classifier module.

4. The target object detection system of claim 3, further comprising a feedback unit which is connected electrically to said detection unit for receiving the notification signal, and which is configured to receive at least a vehicle signal that is associated with operation of a vehicle provided with said detection unit, and to output a false positive feedback signal to said output module based on the vehicle signal, and
wherein said output module is configured to, in response to receipt of the false positive feedback signal, output the image to said second image processing module of said machine learning unit.

5. The target object detection system of claim 4,
wherein the vehicle signal indicates vehicle speed of the vehicle; and
wherein said feedback unit is further configured to output the false positive feedback signal in at least one of the following scenarios:
- when said feedback unit is in receipt of the notification signal, and a rate of change of decrease of the vehicle speed is not greater than a preset deceleration threshold value; and
- when said feedback unit is not in receipt of the notification signal, and the rate of change of decrease of the vehicle speed is greater than the preset deceleration threshold value.

6. The target object detection system of claim 4,
wherein the vehicle signal indicates a travel distance of a brake pedal of the vehicle; and
wherein said feedback unit is further configured to output the false positive feedback signal in at least one of the following scenarios:
- when said feedback unit is in receipt of the notification signal, and the travel distance of the brake pedal is not greater than a preset brake stroke threshold value; and
- when said feedback unit is not in receipt of the notification signal, and the travel distance of the brake pedal is greater than the preset brake stroke threshold value.

7. The target object detection system of claim 4,
wherein the notification signal indicates presence of an obstacle in the image;
wherein said feedback unit is further configured to receive a crash signal which is generated by a crash sensor of the vehicle and an obstacle distance signal which indicates a distance of the vehicle from the obstacle;
wherein said feedback unit is further configured to output the false positive feedback signal in at least one of the following scenarios:
- when said feedback unit is not in receipt of the notification signal but is in receipt of the crash signal; and
- when the distance of the vehicle from the target object is smaller than a calculated braking distance.

8. The target object detection system of claim 7,
wherein the vehicle signal indicates vehicle speed of the vehicle; and
wherein the calculated braking distance is calculated based on at least the vehicle speed.

9. The target object detection system of claim 3, wherein said updating module is further configured to calculate a trust score for the new weak classifier parameters, and to update the weak classifier parameters of said second classifier module using the new weak classifier parameters and to transmit the new weak classifier parameters to said detection unit for update of the weak classifier parameters of said first classifier module when the trust score thus calculated is greater than a trust score of the weak classifier parameters.

10. A method of target object detection, the method to be implemented by a target object detection system that includes a detection unit and a machine learning unit, the method comprising the following steps of:
- after obtaining an image, by the detection unit, performing an operation associated with classification using weak classifier parameters so as to determine whether a portion of the image resembles a target object;
- when it is determined that the portion of the image resembles the target object, outputting, by the detection unit, a notification signal;
- outputting, by the detection unit, the image to the machine learning unit;
- after receiving the image, performing, by the machine learning unit, operations associated with classification using the weak classifier parameters and strong classifier parameters, respectively, so as to make respective two determinations as to whether the portion of the image resembles the target object; and
- when results of the respective two determinations are different, performing, by the machine learning unit, a training operation using the image so as to obtain new weak classifier parameters which is used to update the weak classifier parameters of the detection unit and of the machine learning unit.

11. The method of claim 10, prior to the step of performing an operation associated with classification, further comprising the step of:
- after receiving a video, capturing, by the detection unit, the image from the video thus received;

wherein the step of performing an operation associated with classification includes
  extracting a first partial image from the image to serve as the portion of the image, and
  performing the operation associated with classification using the weak classifier parameters so as to determine whether the first partial image resembles the target object;
wherein the step of outputting a notification signal includes outputting the notification signal when it is determined that the first partial image resembles the target object.

12. The method of claim 11,
wherein the step of performing operations associated with classification includes
  extracting from the image a second partial image which includes content identical to that of the first partial image and which serves as the portion of the image, and
  performing the operations associated with classification using the weak classifier parameters and the strong classifier parameters, respectively, so as to make the respective two determinations as to whether the second partial image resembles the target object; and
wherein the step of performing a training operation includes
  when the results of the respective two determinations are different, using the image as a training sample for training parameters of the machine learning unit so as to obtain the new weak classifier parameters, and
  updating the weak classifier parameters of the machine learning unit using the new weak classifier parameters and transmitting the new weak classifier parameters to the detection unit for update of the weak classifier parameters of the detection unit.

13. The method of claim 12, the target object detection system further including a feedback unit, subsequent to the step of outputting a notification signal and prior to the step of outputting the image, the method further comprising the steps of, by the feedback unit:
  receiving at least a vehicle signal that is associated with operation of a vehicle provided with the detection unit; and
  outputting a false positive feedback signal to the detection unit based on the vehicle signal;
wherein the step of outputting the image to the machine learning unit includes, in response to receipt of the false positive feedback signal, outputting the image to the machine learning unit.

14. The method of claim 13,
wherein, in the step of receiving at least a vehicle signal, the vehicle signal indicates vehicle speed of the vehicle; and
wherein, the step of outputting a false positive feedback signal includes outputting the false positive feedback signal in at least one of the following scenarios:
  when the feedback unit is in receipt of the notification signal, and a rate of change of decrease of the vehicle speed is not greater than a preset deceleration threshold value; and
  when the feedback unit is not in receipt of the notification signal, and the rate of change of decrease of the vehicle speed is greater than the preset deceleration threshold value.

15. The method of claim 13,
wherein, in the step of receiving at least a vehicle signal, the vehicle signal indicates a travel distance of a brake pedal of the vehicle; and
wherein, the step of outputting a false positive feedback signal includes outputting the false positive feedback signal in at least one of the following scenarios:
  when the feedback unit is in receipt of the notification signal, and the travel distance of the brake pedal is not greater than a preset brake stroke threshold value; and
  when the feedback unit is not in receipt of the notification signal, and the travel distance of the brake pedal is greater than the preset brake stroke threshold value.

16. The method of claim 13,
wherein in the step of outputting a notification signal, wherein the notification signal indicates presence of an obstacle in the image;
wherein, the step of receiving at least a vehicle signal includes receiving a crash signal which is generated by a crash sensor of the vehicle, and an obstacle distance signal which indicates a distance of the vehicle from the obstacle;
wherein, the step of outputting a false positive feedback signal includes outputting the false positive feedback signal in at least one of the following scenarios:
  when the feedback unit is not in receipt of the notification signal but is in receipt of the crash signal, and
  when the distance of the vehicle from the target object is smaller than a calculated braking distance.

17. The target object detection system of claim 16,
wherein, in the step of receiving at least a vehicle signal, the vehicle signal indicates vehicle speed of the vehicle; and
wherein, in the step of outputting the false positive feedback signal, the calculated braking distance is calculated based on at least the vehicle speed.

18. The target object detection system of claim 12,
wherein, subsequent to the step of using the image as a training sample for training parameters and prior to the step of updating the weak classifier parameters, the step of performing a training operation further includes calculating a trust score for the new weak classifier parameters; and
wherein the step of updating the weak classifier parameters includes, when the trust score thus calculated is greater than a trust score of the weak classifier parameters, updating the weak classifier parameters of the machine learning unit using the new weak classifier parameters, and transmitting the new weak classifier parameters to the detection unit for update of the weak classifier parameters of the detection unit.

* * * * *